US011188357B2

(12) United States Patent
Joffe et al.

(10) Patent No.: US 11,188,357 B2
(45) Date of Patent: Nov. 30, 2021

(54) SYSTEM AND METHOD FOR INTERACTIVE EXPERIENCE (71) Applicants: Sony Corporation, Tokyo (JP); Sony Pictures Entertainment Inc., Culver City, CA (US)

(72) Inventors: Paul Joffe, Los Angeles, CA (US); Shereef Morse, Saugus, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 14 days.

(21) Appl. No.: 15/450,307

(22) Filed: Mar. 6, 2017

(65) Prior Publication Data
US 2017/0256088 A1 Sep. 7, 2017

Related U.S. Application Data (60) Provisional application No. 62/303,692, filed on Mar. 4, 2016.

(51) Int. Cl.
G06F 9/451 (2018.01)
G06F 3/0484 (2013.01)
A63F 13/69 (2014.01)

(52) U.S. Cl.
CPC .............. G06F 9/453 (2018.02); A63F 13/69 (2014.09); G06F 3/04842 (2013.01); A63F 2300/8064 (2013.01)

(58) Field of Classification Search
CPC ...... G06F 3/04842; G06F 9/453; A63F 13/69; A63F 2300/8064
See application file for complete search history.

(56) References Cited

U.S. PATENT DOCUMENTS

| 8,187,068 | B2 | 5/2012 | Slomiany | |
| 10,086,284 | B2* | 10/2018 | Darley | A63F 13/533 |
| 2003/0100355 | A1 | 5/2003 | Hannay | |
| 2003/0139210 | A1* | 7/2003 | Raben | A63F 9/0098 463/9 |
| 2004/0090000 | A1* | 5/2004 | Ye | A63D 15/00 273/123 R |
| 2007/0099704 | A1 | 5/2007 | Liu | |
| 2012/0071220 | A1* | 3/2012 | Hoyt | A63F 3/0421 463/9 |
| 2013/0143632 | A1 | 6/2013 | Geiger | |
| 2014/0066191 | A1* | 3/2014 | Yang | A63F 13/10 463/29 |

(Continued)

FOREIGN PATENT DOCUMENTS

KR 2013132365 A * 12/2013 ............. A63F 13/10

Primary Examiner — Tadesse Hailu
(74) Attorney, Agent, or Firm — Mayer & Williams PC (57) ABSTRACT Systems and methods disclosed include a multiple step process in providing a visual or audiovisual experience, with the multiple steps providing a combination of different types of interactive visual or audiovisual experiences. By combining different types of experiences in this way, the user interactive visual experience is made significantly more interesting to a user. In addition, by linking multiple experiences in this way, the benefits of multiple experiences are gained while reducing the technological processing power required to create the experiences.

24 Claims, 7 Drawing Sheets (56) References Cited

U.S. PATENT DOCUMENTS

| | | | | |
|---|---|---|---|---|
| 2014/0084541 A1* | 3/2014 | Hedgecock | ......... | A63F 3/00634 273/272 |
| 2014/0131945 A1* | 5/2014 | McClung, III | ........ | A63F 3/0423 273/272 |
| 2015/0298004 A1* | 10/2015 | Villoria | ................... | A63F 13/46 463/42 |
| 2015/0325079 A1* | 11/2015 | Alsip | .................... | G07F 17/323 463/20 |
| 2016/0236086 A1* | 8/2016 | Nilsson | ................ | A63F 13/573 |
| 2016/0287991 A1* | 10/2016 | Norden | ................ | A63F 13/426 |
| 2017/0043251 A1* | 2/2017 | Magdalena | .......... | A63F 13/837 |
| 2017/0216725 A1* | 8/2017 | Darley | .................. | A63F 13/812 |

* cited by examiner

SYSTEM AND METHOD FOR INTERACTIVE EXPERIENCE

CROSS-REFERENCE TO RELATED APPLICATIONS

This application claims benefit of priority of U.S. Provisional Patent Application Ser. No. 62/303,692, entitled "PUZZLE UNLOCKING", filed Mar. 4, 2016, owned by the assignee of the present application and herein incorporated by reference in its entirety.

BACKGROUND

Many interactive user experiences are known that are driven in one way or another by data from user input. Typically such are singular experiences, and involve performing an action to result in a particular visual or audiovisual interactive experience. Once the same has been seen by a user, the user may begin to lose interest in the interactive experience.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles address issues above in several ways. In particular, systems and methods according to present principles include a multiple step process in providing a visual or audiovisual experience, with the multiple steps providing a combination of different types of interactive visual or audiovisual experiences. By combining different types of experiences in this way, the user interactive visual experience is made significantly more interesting to a user. In addition, by linking multiple experiences in this way, the benefits of multiple experiences are gained while reducing the technological processing power required to create the experiences.

In a first aspect, the invention is directed towards a user interface of a computing environment, including: storing at least one key element in a memory of a computing environment; instantiating on a first portion of a user interface on the computing environment a data collection including the stored at least one key element, where the data collection including the at least one key element is in a blinded mode, such that the data collection shows a placeholder image in the location of, but not the value of, the at least one key element; instantiating on a second portion of the user interface on the computing environment a plurality of target elements, the instantiating on the second portion causing at least one of the plurality of target elements to additionally display on the target element the value of a key element from the stored at least one key element; receiving user input on the user interface, the received user input indicating an act to be performed by an object on the second portion of the user interface; causing the object to perform the indicated act on the second portion of the user interface; and if the act matches a predetermined criterion, then unblinding a key element on the data collection, the unblinding displaying the value of the key element on the data collection, and further if the act matches the predetermined criterion, initiating a routine resulting in a first visual or audiovisual effect on the second portion of the user interface, the first visual or audiovisual effect including at least a removal of the target element with the key element from the second portion of the user interface.

Implementations of the method may include one or more of the following. The target element with the key element may be at least partially surrounded by a plurality of adjacent target elements, the plurality sharing a parameter in common with the target element with the key element value. The parameter may be a color, a symbol, or a design, or a combination of the above. The act may be a tactical maneuver. The object may be a projectile object. The first visual or audiovisual effect may further include a rearrangement of at least a portion of remaining ones of the plurality of target elements. The rearrangement may be at least partially based on a calculation performed by a physics engine. The projectile object may perform the indicated act based at least partially on a calculation performed by a physics engine. The first visual or audiovisual effect may include instantiation of an animation indicating a removal of one or more of the target elements adjacent the target element with the key element value, where the target elements that are removed are those that share the parameter with the target element with the key element value. The parameter may be a color, a symbol, or a design, or a combination of the above. Upon the occurrence of a first rule, the object may be transformed into a new target element among the plurality of target elements. The first rule may be that if the object is moved toward the plurality of target elements based on the user input, and a first target element hit by the object is one that the object does not share a common parameter with, then the object is transformed into a new target element among the plurality of target elements. At least a plurality of blinded key elements may be stored in the memory of the computing environment. The storing at least one blinded key element may follow a step of receiving at least one blinded key element from a storage of the computing environment. The storing at least one blinded key element may follow a step of receiving at least one blinded key element from a network environment to which the computing environment is in signal communication. The computing environment may be a smart phone, tablet computer, laptop computer, desktop computer, smart television, smart watch, or gaming console. The first portion of the user interface and the second portion of the user interface may partially overlap. The first visual or audiovisual effect may cause a second visual or audiovisual effect, the second visual or audiovisual effect prompting the user to perform an action resulting in a selection of, or initiate a random selection of, an item affecting the step of receiving user input on the user interface. The stored at least one key element may represent a word or phrase or a shape.

In a second aspect, the invention is directed towards a non-transitory computer-readable medium, including instructions for causing a computing environment to perform a method of providing a programmed visual or audiovisual effect based on input by a user on a user interface, including: receiving input from a user, the input received on a user interface, the input representing at least a direction for a projectile object to traverse across a generated geometric shape, the generated shape having located thereon a plurality of rendered objects; simulating and animating movement of the projectile object according to the received input, the simulated and animated movement of the projectile object resulting in an intersection of a first collider component associated with the projectile object with a second collider component associated with one or more of the rendered objects, the method causing one of at least two programmed routines to run if the intersection occurs, a first programmed routine causing a first visual or audiovisual effect on the user interface of a removal of a rendered object if the projectile object and the intersected rendered object share a predetermined parameter, a second programmed routine causing a second visual or audiovisual effect on the user interface of an attachment of the projectile object to the one or more intersected rendered objects if the projectile object and the intersected rendered object do not share a predetermined parameter; such that the first programmed routine also causes a visual or audiovisual effect of a removal of one or more adjoining rendered objects if the adjoining rendered objects share the predetermined parameter with the projectile object; such that one or more of the plurality of rendered objects includes one or more key elements, a plurality of key elements constituting a data collection having a predetermined order, and such that if a rendered object having a key element is removed, the corresponding key element appears at a location in a representation of the plurality of key elements; and such that once all of the key elements appear at respective corresponding locations in the representation of the plurality of key elements, another visual or audiovisual effect is instantiated on the user interface.

Implementations of the invention may include one or more of the following. The second programmed routine may further include transforming the projectile object into one of the plurality of rendered objects. The plurality of key elements may constitute a data collection forms a word or phrase. The plurality of key elements may constitute a data collection that forms a shape, and the key elements may each be subshapes of the shape.

In a third aspect, the invention is directed towards a method of providing a programmed visual or audiovisual effect based on input by a user on a user interface, including: instantiating a data collection associated with a plurality of key elements, the data collection visualized by instantiating and displaying in a first portion of a user interface one or more placeholder user interface elements, each placeholder user interface element representing one of the key elements, the placeholder user interface element initially displayed but not the value of the key element; instantiating a user interaction zone in a second portion of the user interface, the user interaction zone including a plurality of target elements, a subset of target elements including and displaying a value of a key element associated with the data collection; receiving a user input and displaying a first effect of the received user input on the user interaction zone; determining whether the user input is associated with a key element; where if the user input is associated with a key element, the value of the key element is displayed within an associated placeholder user interface element, and where if the user input is not associated with the key element, displaying a second effect of the received user input in the second portion of the user interface.

Implementations of the invention may include one or more of the following. The value of the key element may represent a letter or a subshape, and where the data collection represents a word/phrase or a shape, respectively. The first effect of the received user input may be to display an object moving toward the plurality of target elements, a direction of the object corresponding to the received user input. The second effect of the received user input may be to display an object moving toward and attaching to the plurality of target elements, a direction of the object corresponding to the received user input. If the user input is associated with a key element, then the method may further include displaying a removal of the target element including and displaying the value of the key element. The determining whether the user input is associated with a key element may include determining if an object associated with the user input shares a parameter in common with a target element with which the object associated with the user input collides. The parameter may be a color.

In a fourth aspect, the invention is directed towards a data structure stored on a non-transitory computer readable medium, the data structure including: a first plurality of fields representing a respective first plurality of key elements, the first plurality representing key elements to be displayed in an initially blinded fashion on a first portion of a user interface; a second plurality of fields representing a respective second plurality of key elements, the second plurality representing one or more key elements to be displayed on target elements in a second portion of the user interface.

Implementations of the invention may include one or more of the following. The first plurality may be an ordered plurality. The second plurality may be determined by randomly selecting key elements from the first plurality, and the second plurality may be ordered according to the order of the random selections. The random selection may be made without reinsertion of the selected key element.

In a fifth aspect, the invention is directed towards a data structure stored on a non-transitory computer readable medium, the data structure including: a first plurality of fields representing a respective first plurality of key elements, the first plurality representing key elements that were displayed in an initially blinded fashion on a first portion of a user interface; a second plurality of fields representing a respective second plurality of key elements, the second plurality representing an order in which one or more key elements were displayed on target elements in a second portion of the user interface.

Implementations of the invention may include one or more of the following. The first plurality of fields and the second plurality of fields may have been filled based on the method of providing a plurality of video or audiovisual effects based on input by a user on a user interface of a computing environment according to one or more of the methods described here.

Advantages of the invention may include, in certain embodiments, one or more of the following. Users are treated to a visual or audiovisual experience that they previously were unaware of. The user experience benefits of a multiple game system are enjoyed while reducing the processing power required to create the user experience, over the power required if the experiences were not so linked. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless otherwise noted.

DETAILED DESCRIPTION

Figure 1:
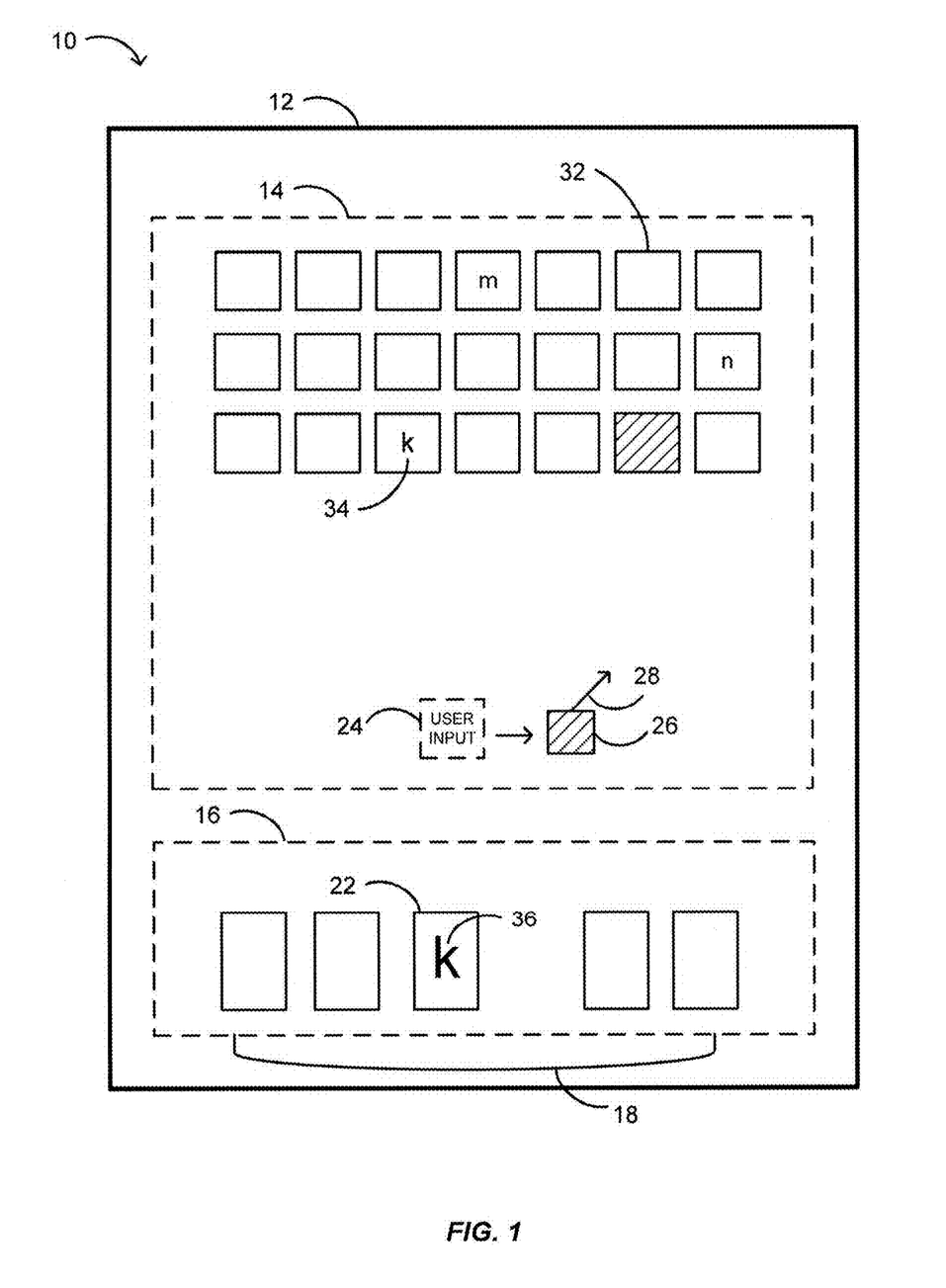
FIG. 1 shows a schematic illustration of a user interface according to present principles.

FIG. 1 schematically depicts a system 10 such as a computing environment including a user interface 12, the computing environment including a processor and memory, the memory storing, and the processor performing, instructions resulting in a method of providing a plurality of visual or audiovisual effects based on input by a user on the user interface. Instantiated on a first portion 16 of the user interface on the computing environment is a data collection 18 having an initial display, the initial display having a number of placeholder elements 22, each placeholder element associated with a value of a key element 36. In the exemplary FIG. 1, the key element 36 is shown in an "unblinded" mode, where the same has been uncovered by the operation of a separate portion of the user interface to be described below. Generally the placeholder elements 22 in an initial display of the data collection 18 are in a "blinded" mode, where the value of the key element, sometimes termed just "key element", is obfuscated or obscured. The same is then revealed by the operation on the separate portion of the user interface.

The collection of key elements within the initial display is as noted referred to as a data collection. In some cases the data collection has an associated order, such as where the key elements constitute letters within a phrase or word, and in other cases the data collection may not have an associated order, where the object of the visual experience is simply to collect a number of certain key elements without regard to order. Besides letters, key elements may also include colors, subshapes, and so on. Where the key elements are subshapes, the data collection may may be an overall shape that the subshapes form, e.g., pizza slices within a pizza. Specific embodiments are described in an example section below The separate portion described above includes instantiating on a second portion of the user interface 14 a plurality of generally stationary target elements 32. At least some of the plurality of target elements additionally display the value of key elements, which may be key elements associated with the data collection 18. Other key elements may also be displayed on one or more of the plurality of target elements, where such other key elements are not associated with the data collection 18. In FIG. 1, the value of a key element 34 is shown as "k". Another key element is displayed in a top row as the letter "m". In many implementations, to increase interest in the user interactive visual experience, key elements may be placed farther away from where a user input is generated, described below, such as in a top row or section.

Data discussed above is generally stored in storage and/or in a memory of the computing environment, such data including that pertaining to the data collection as well as that pertaining to the plurality of target elements, particularly those that contain key element values. Such data may be resident within the computing environment after being downloaded or may be downloaded anew for each interactive experience.

A section of the second portion 14 is shown by element 24 pertaining to user input. Various user input acts may be described as performed by a user and recorded and analyzed by the system 12 to determine if the act causes an effect on the target elements, e.g., causing the same to appear to "burst" and thus releasing any key elements for potential inclusion in the data collection, e.g., be unblinded. For example, certain user input acts may cause a target element showing a key element, e.g., such as key element 34, to be released, which then causes the value of the key element to become unblinded or revealed in the data collection 18 in the first portion of the user interface.

An exemplary type of user input 24 is where an object 26 is disposed somewhere on the user interface 12, and the object is caused to move toward the plurality of target elements 32, e.g., by a user "swiping" action. A preview of the direction may be portrayed on the second portion 14, e.g., by an aiming arrow 28. For example, the user can touch a portion of the user interface, and a direction vector may be formed having an initial position at the location of the object 26 and a final position at the point of the user's touch. By releasing the touch, the object may be caused to move in the direction indicated by the vector. It will be understood that other ways may be employed to move an object 26 towards the plurality 32, i.e., the second interactive user experience, e.g., by the swiping action noted above. In addition, it will be understood that other ways may be employed to cause the release of a value of a key element so that the same may then be revealed in the first portion of the user interface 16, i.e., as part of the first interactive experience. In any case, the user input may result in the act of releasing (or not releasing) the key element from the plurality of target elements. Put another way, the user input causes instantiation of a visual effect and thus provides aspects of a man machine interface.

More generally, if the act caused by the user input matches a predetermined criterion, then a key element is unblinded on the data collection, i.e., the plurality of placeholder elements in the first portion of the user interface 16 and having an initial display with either some or all of the key elements represented by placeholder elements obfuscated or blinded. The un-blinding thus displays the value of the key element in the data collection. Further upon the occurrence of the act matching the predetermined criterion, a routine is initiated or instantiated that results in a first visual or audiovisual effect on the second portion of the user interface, the first visual or audiovisual effect including at least a removal of the target element with the key element from the second portion of the user interface.

Figure 2:
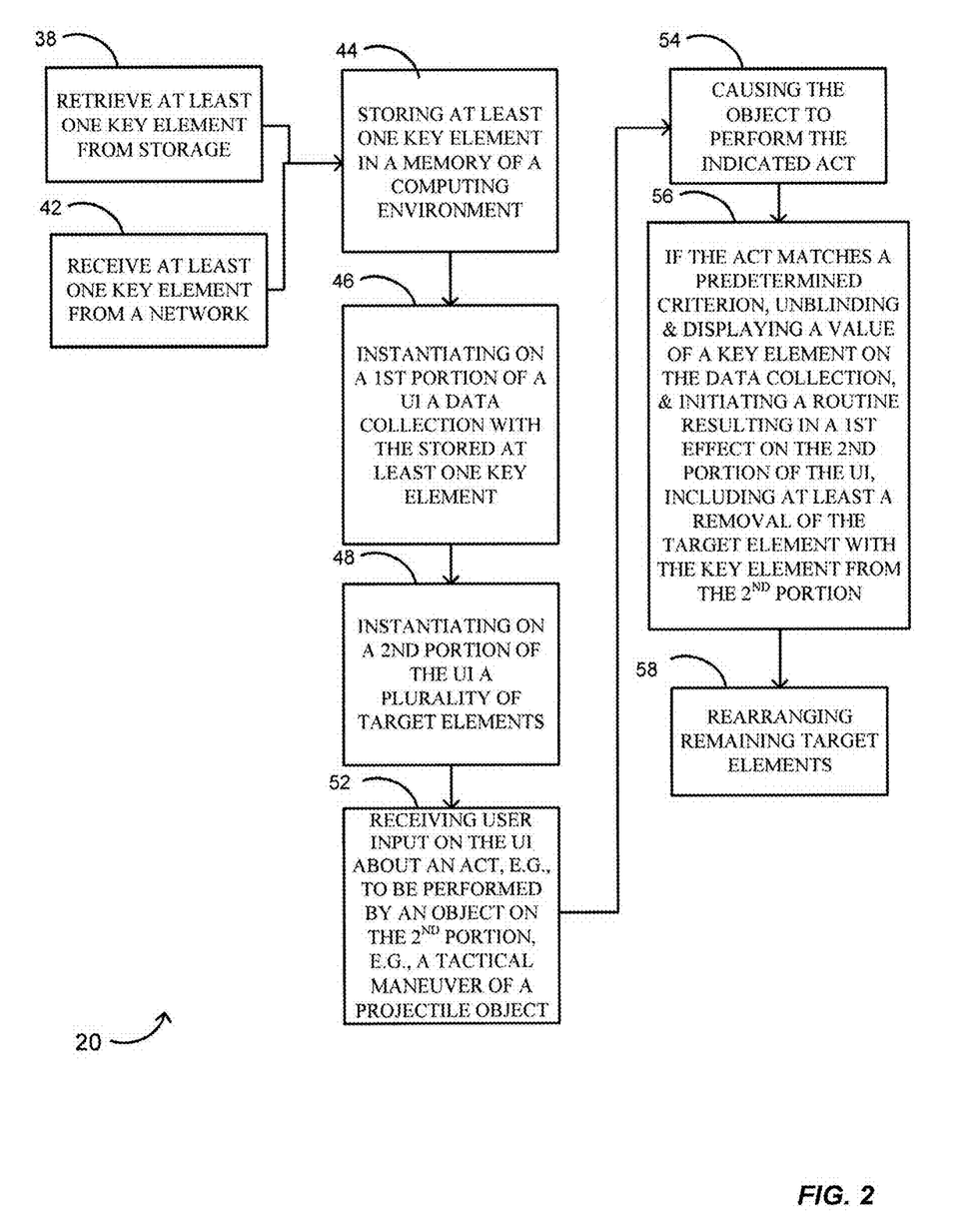
FIG. 2 is a flowchart of a first method according to present principles.

In a method according to the above, and referring to the flowchart 20 of FIG. 2, a first step is to store at least one key element in a memory of a computing environment (step 44). This step may be performed in a number of ways. For example, this step may be proceeded with retrieving at least one key element from storage (step 38). In another implementation, this step may be preceded by receiving at least one key element from a network (step 42).

In a subsequent step, an initial display of the stored at least one key element may be instantiated on a first portion of a user interface (step 46). The initial display may be of a data collection as described above.

A next step may be instantiating on a second portion of the UI the plurality of the target elements (step 48). User input may then be received on the UI (step 52). The user input may be about an act to be conducted on a second portion of the UI. For example, the act may be performed by an object on the second portion of the UI. In a particular implementation, the object is a projectile object, and the same executes a tactical maneuver according to the received user input. The object is then caused to perform the indicated act according to the user input (step 54).

The consequences of the act are then analyzed by the system. For example, if the act matches a predetermined criterion, then a step may be performed of un-blinding and displaying a value of a key element on the initial display of the data collection, and also initiating a routine resulting in a first visual or audiovisual effect on the second portion of the user interface, including at least a removal of the target element (having the key element) from the second portion of the user interface (step 56). Following the removal, the remaining target elements of the plurality may optionally be re-arranged (step 58).

Variations of certain implementations are now described. As shown in FIG. 1, the target element with the key element value may be at least partially surrounded by a plurality of adjacent target elements, the plurality sharing a parameter in common with the target element with the key element value, e.g., wherein the parameter is a color, a symbol, a design, or a combination of the above. For example, target elements may be grouped or clumped, with target elements within a clump having a common color. The removal of one target element may then also cause the removal of other target elements of like color, so long as the elements within the grouping are contiguous.

The act instigated, initiated, instantiated, or performed by the user input may include a tactical maneuver, such as where the user input constitutes a user causing a virtual or computer-generated object to traverse across the user interface and contact one or more of the plurality of target elements.

The first visual or audiovisual effect may cause the removal of one or more of the plurality, but it may also cause an instantiation of an animation indicating a removal of one or more of the target elements adjacent the target element with the key element value. The additionally removed target elements may include those that share a parameter with the target element having the key element value. Moreover, the first visual or audiovisual effect may further include a rearrangement of at least a portion of remaining ones of the plurality of target elements. That is, once a certain number of target elements are removed, the remaining target elements may rearrange themselves into ordered regular clumps, or additional target elements may be instantiated and caused to appear on the second portion of the user interface. The rearrangement may be at least partially based on a calculation performed by a physics engine. In the case where the user input is embodied by a projectile or other object, the object may perform the indicated act based at least partially on a calculation performed by a physics engine as well.

In another variation, upon the occurrence of a first rule, if the user interface is implemented at least in part by an object, the object may be transformed into a new target element among the plurality of target elements. An example of such a first rule is that if the object is moved toward the plurality of target elements based on the user input, and a first target element hit by the object is one that the object does not share a common parameter with, then the object may be caused to stop movement where it touches the plurality, i.e., may be caused to transform into a target element and/or "stick" to remaining ones of the plurality.

The computing environment may be a smart phone, tablet computer, laptop computer, desktop computer, smart television, smart watch, or gaming console. The first portion of the user interface may at least partially overlap with the second portion of the user interface. The user interface may be thought of as a "level" user interface, in that it may represent one level of a multilevel user interactive experience.

Besides the actions caused by the instantiation of the first visual or audiovisual effect, the same may further cause instantiation of an ancillary visual or audiovisual effect, the ancillary visual or audiovisual effect prompting the user to perform an action resulting in a selection of, or initiate a random selection of, an item affecting the step of receiving user input on the user interface. Such ancillary effects may be minigames that resulted in, as described below, extra benefits within the main game, e.g., boosters and the like.

Figure 3:
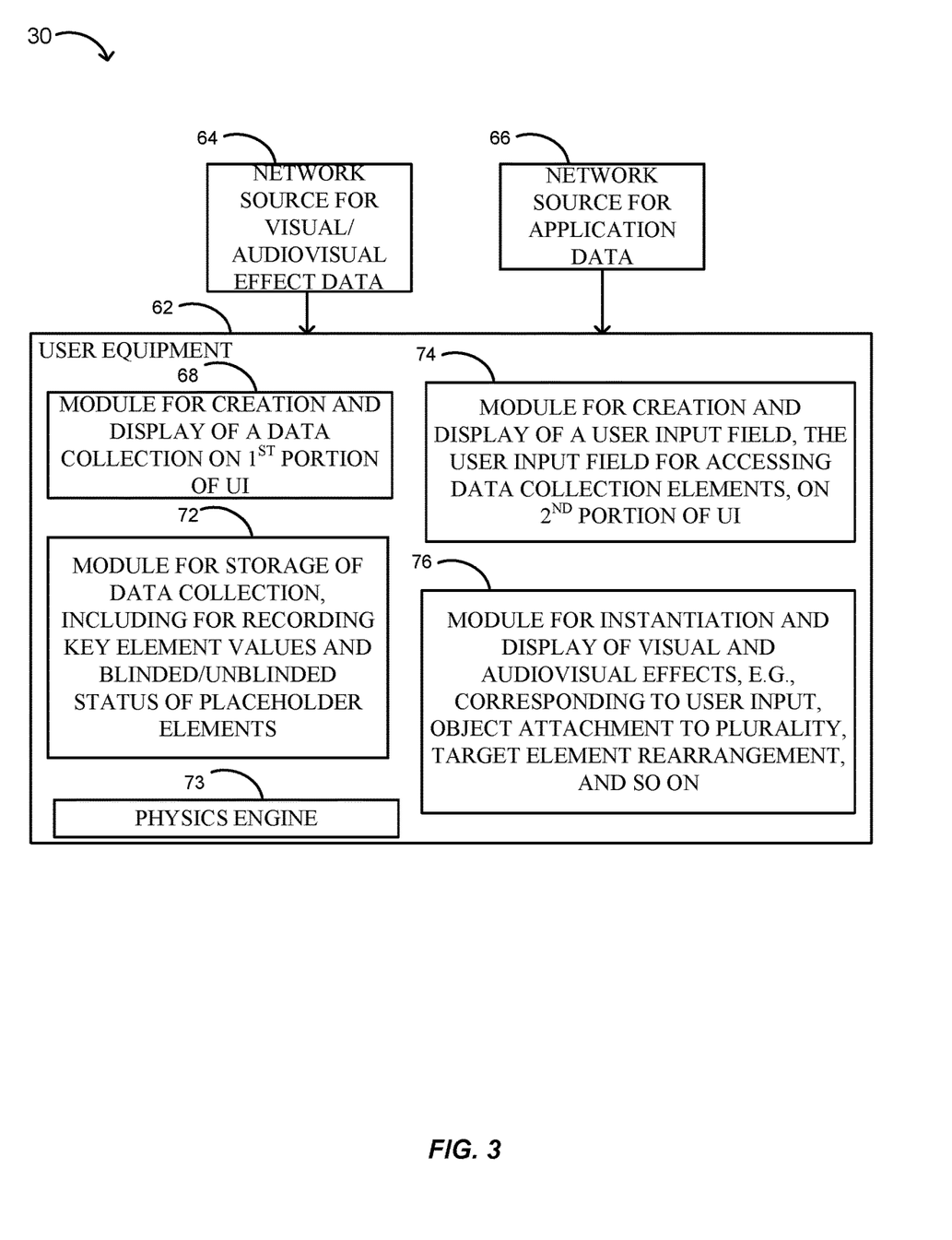
FIG. 3 is a schematic modular depiction of a system according to present principles.

FIG. 3 illustrates a system 30 in which present systems and methods may be implemented. In particular, a user equipment 62 is shown in communication with various network sources, e.g., a network source 64 for receipt of visual and audiovisual effect data, and a network source 66 for receipt of application data. In this exemplary implementation, the network source 64 may be employed to receive various types of interesting visual and audiovisual (or just audio) effects, while network source 66 may serve as a source for key elements, data collections, colors, words, phrases, and so on. In some cases the network source 64 may be situated on the same server as the network source 66.

The user equipment 62 includes a number of modules. Generally the modules are software or hardware components that contain instructions that when run by a processor (not shown) transform the user equipment 62 from a general-purpose computer into a special purpose computer, including a special purpose computer that transforms user input data into a user and algorithmically controlled interactive visual or audiovisual experience, acting as a man-machine interface thereby.

A first module 68 is provided for creation and display of a data collection on a first portion of a user interface. This module may be in communication with the network source 66 and may further include memory to store one or more data collections which may then be displayed (when unblinded) on a first portion of a user interface. The user equipment 62 may further include a module 72 for storage of the data collection, including for recording key element values and keeping track of the blinded/unblinded status of placeholder elements. The module 72 is thus in communication with the memory to provide storage and recording functionality. Further the module 72 keeps track of whether the placeholder elements are in a blinded configuration (in which case the values of the underlying key elements are not shown), or in a unblinded configuration, in which case the values are shown.

The user equipment 62 further includes a module 74 for creation and display of a user input field, the user input field for accessing data collection elements. In one implementation the data collection field is on a second portion of the user interface. In some cases the module 74 accesses the stored data collection as stored by the module 68. In any case, the module 74 allows for a way in which a user may cause the revealing or un-blinding of key elements as obfuscated within the placeholder elements in the first portion of the user interface (though as noted much of the action of module 74 takes place on the second portion of the user interface).

The user equipment may additionally include a physics engine 73 for calculation of object movement and collisions. Finally, the user equipment 62 may include a module 76 for instantiation and display of visual and audiovisual effects. Such audio and visual effects are as described above, and may correspond to user input effects, effects related to an object attachment to the plurality of target elements, effects related to target element removal, effects related to target element rearrangement, and so on.

In another implementation, systems and methods according to present principles are embodied as a computer program stored on a non-transitory computer readable medium which may constitute a portion of a computing environment. Such a computer program generally includes instructions which when run by a processor cause the computing environment to perform a method. One method is as described above in connection with the flow chart 20 of FIG. 2. Other methods are described below in connection with FIGS. 4, 5, and 6.

Figure 4:
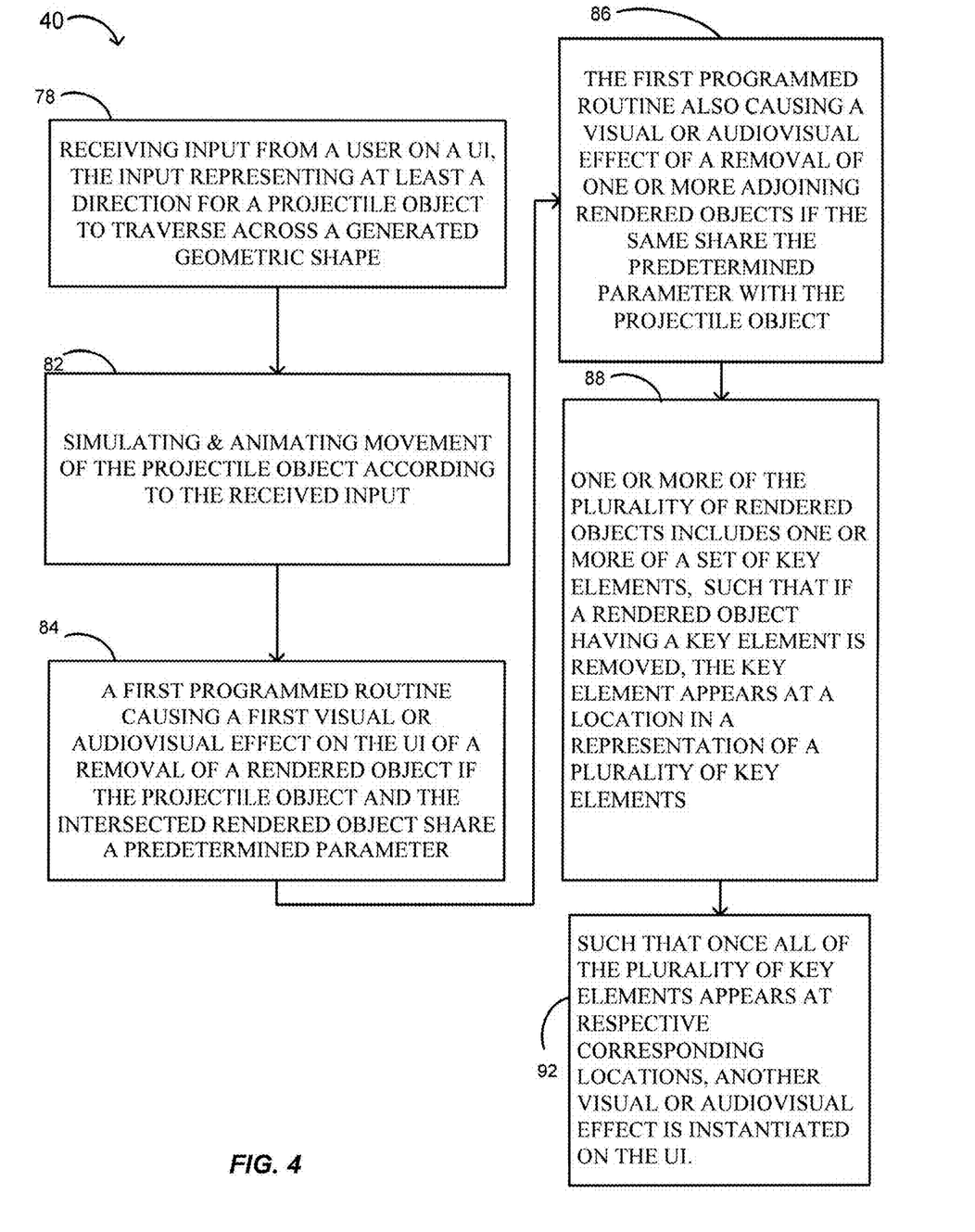
FIG. 4 is a flowchart of a second method according to present principles.

Referring next to the flowchart 40 of FIG. 4, a first step is receiving input from a user on a user interface (step 78), the input representing at least a direction for a projectile object to traverse across a generated geometric shape. The movement of the projectile object may then be simulated and/or animated (step 82). The simulation and animation may be according to the received input. For example, if the user performs a swishing motion in a particular direction on a touchscreen user interface, the projectile object may be caused to move in the same direction. The speed of the object may be fixed, or may be tied to the speed of the user input. Where the user input is implemented as a projectile object, the same may be caused to deflect off one or more of the sides of the user interface, i.e., the second portion, similar to the way billiard balls deflect off of sidewalls, and a physics engine may be employed for such calculations.

Generally, where an object is included as part of the user input, the object will intersect with one or more rendered target objects. More particularly, a first collider component of the projectile object will intersect (share a portion of the same world space with) a second collider component associated with one or more of the rendered objects, i.e., rendered target objects. When a collision is detected, one of at least two programmed routines may be caused to run.

A first programmed routine (step 84) causes a first visual or audiovisual effect on the user interface of a removal of a rendered object if the projectile object and the intersected rendered object share a predetermined parameter. The first programmed routine may also cause (step 86) a visual or audiovisual effect of a removal of one or more adjacent or adjoining rendered objects if the same share the predetermined parameter with the projectile object (and the initial intersected object).

One or more of the plurality of rendered objects may include one or more of a set of key elements, the set constituting a data collection, in some cases having a predetermined order or combination. If a rendered object having a key element is removed, the key element may be caused to appear in a location in a representation of a plurality of key elements (step 88). That is, the key elements may appear overlaid on top of or otherwise atop or associated with a rendered target object, and if the rendered target object with such a key element is caused to be removed, the key element may then appear in a corresponding fashion in a representation of the plurality of key elements. Of course, the value will only appear in the representation of the plurality of key elements if the same is actually part of the plurality of key elements. For example, if the data collection or plurality of key elements represents the word "cat", and the key element appearing atop a rendered target object is a "u", then there would be no revealing of a "u", as there is no corresponding element in the plurality of key elements.

Once all of the plurality of key elements appears at respective corresponding locations, a different (or the same) audio or visual or audiovisual effect may be generated (step 92). In some cases, where the user believes they are able to "complete" the data collection manually, in the sense of knowing what all the key elements are without having all of the placeholder elements unblinded, the user may be enabled to stop the interactive experience and finish entry of the key elements manually. In this case, the end result of the user input may be compared against the correct answer, and success or failure determined for the user.

Variations of the above implementation will be understood. In one implementation, the second programmed routine further includes transforming the projectile object into one of the plurality of rendered objects. The plurality of key elements may form a word or phrase. In the same way, the same may form a shape, where the key elements are each sub shapes that together form the overall shape. In another variation, if the rendered target object and the projectile object share the predetermined parameter, a further visual or audiovisual effect may be instantiated on the user interface.

Figure 5:
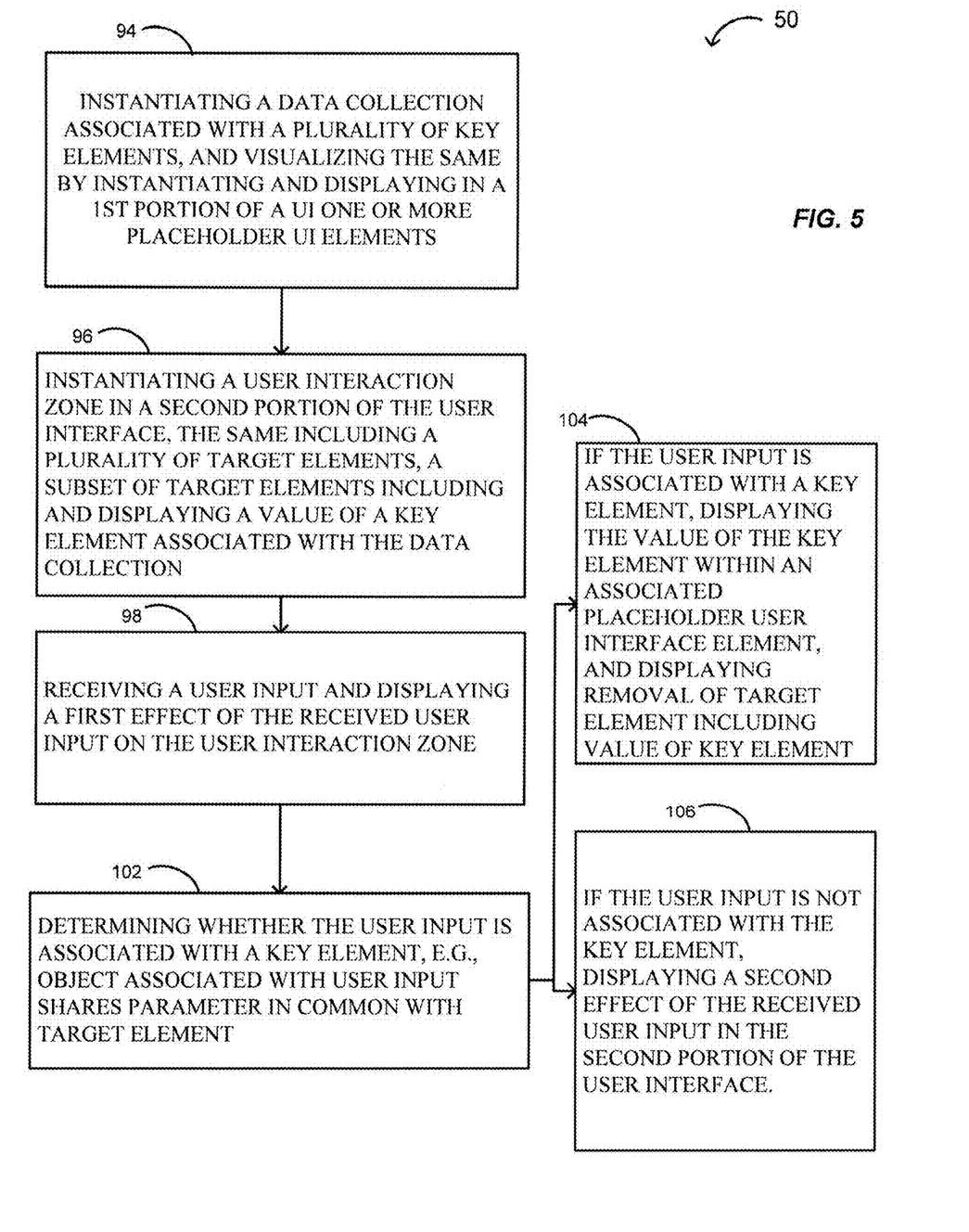
FIG. 5 is a flowchart of a third method according to present principles.

The flowchart 50 of FIG. 5 illustrates yet another method of providing a programmed visual or audiovisual effect based on input by a user on a user interface. In a first step, a data collection is instantiated which is associated with a plurality of key elements (step 94), the data collection visualized by instantiating and displaying in a first portion of a user interface one or more placeholder user interface elements, each placeholder user interface element representing one of the key elements, the placeholder user interface element initially displayed but not the value of the key element. A user interaction zone is instantiated in or on a second portion of the user interface (step 96), the user interaction zone including a plurality of target elements, a subset of target elements including and displaying a value of a key element associated with the data collection. Generally the user interaction zone allows a level of user input, and the zone includes a plurality of target elements, at least one and generally a subset of target elements including and displaying a value of a key element associated with the data collection.

A subsequent step is receiving a user input (step 98) and displaying a first effect of the received user input on the user interaction zone. For example, the user input may cause an object to be moved across the user interface and toward the plurality of target elements. The direction of object traversal is based on the received user input, e.g., is parallel thereto, is collinear therewith, or bears some other relation thereto. In some cases, particularly where the user input object is not associated with one or more of the plurality of target elements, the object may simply be caused to stop moving and to appear in a way attached to one or more of the plurality of target elements. For example, the user input object may simply stop where it hits, where the same is not associated with the target element that it struck.

In a next step, it is determined whether the user input is associated with a key element (step 102). For example, in one implementation, a user input is associated with a key element if an object is associated with the user input and the object has a common color with the target element which the object strikes as a result of the user input. Put another way, if the user causes an object to strike a target element, and both have the same color, then it may be determined that the user input is associated with a key element.

If the user input is associated with the key element (step 104), then the value of the key element may be displayed within an associated placeholder user interface element. Moreover, the method may further include displaying a removal of one or more of the target elements. The target elements removed may include those struck by the object or those adjoining the target elements struck by the object, so long as the same are contiguous and share the parameter in common.

On the other hand, if the user input is not associated with the key element, then a second effect of the received user input may be displayed in the second portion of the user interface (step 106). As noted, an object associated with such a user input may be caused to attach to and become one of the plurality of target elements.

Variations of the above method are now described. The value of the key element may represent a letter or a sub shape, and the data collection may represent a word/phrase or a shape, respectively. The first effect of the received user input may be to display an object moving towards the plurality of target elements, a direction of the object corresponding to the received user input. The second effect of the received user input may be to display an object moving towards and attaching to the plurality of target elements, a direction of the object corresponding to the received user input. The user input may be associated with a key element, and the method may further include displaying a removal of the target element including and displaying the value of the key element. The determining whether the user input is associated with a key element may include determining if an object associated with the user input shares a parameter in common with a target element with which the object associated with the user input collides, e.g., a color.

Figure 6:
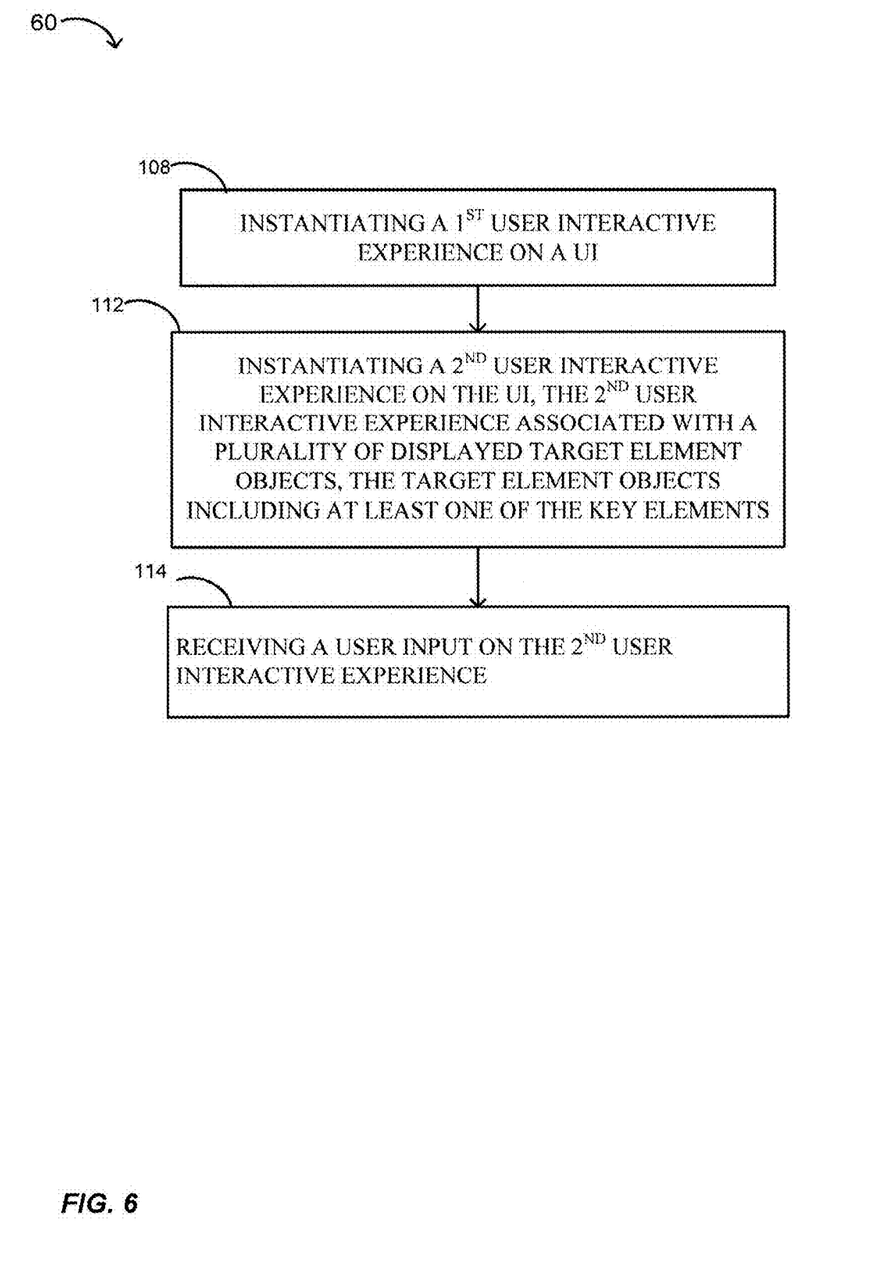
FIG. 6 is a flowchart of a fourth method according to present principles.

Another implementation of a method is shown by the flowchart 60 of FIG. 6. In this flowchart, a first step is the instantiation of a first user interactive experience on a user interface (step 108). The first user interactive experience may be associated with the stored data collection, e.g., a word or phrase with alphanumeric key elements, or a shape constituted of a plurality of subshapes or colors. Variations of such data collections will also be understood given this teaching. In any case, the data collection is stored in a memory, and values of the key elements are obfuscated and subject to non-obfuscation upon the occurrence of a reveal condition.

A next step is to instantiate a second user interactive experience on the UI, the second user interactive experience associated with a plurality of displayed target element objects, the target element objects including at least one of the key elements (step 112). In a last step, user input is received on the second user interactive experience (step 114). If the user input matches a predetermined criterion, or causes a predetermined criterion to be met, then the reveal condition is flagged as satisfied. In this case, the obfuscated key element value on the first user interactive experience is revealed.

Which key element is revealed is generally determined on the basis of the received user input from step 114. In more detail, the received user input generally, if resulting in a release or unlocking of key elements, is associated with the value of a key element. For example, the user input may cause a target element having a key element displayed to be removed or unlocked, in which case the corresponding key in the data collection is revealed, i.e., that associated with the first user interactive experience. Of course, in many cases the user input will affect a target element that does not have a key element displayed thereon, or may not affect any target element at all. In these cases, the user visual experience may simply continue, without a step of revealing the value of a key element in the data collection. It is noted that the user input may still cause one or more of the target elements to be removed, but if the removed target elements do not include a value of a key element within the data collection, then the status of the obfuscated data collection will not change, although a visual or audiovisual effect may still be displayed. It is also noted that in some cases the user may not strike anything, i.e., or user input object may miss the plurality of target elements completely. In this case, a separate visual or audiovisual effect may be created, e.g., akin to a bowling ball going down a gutter.

Example Implementation

Figure 7:
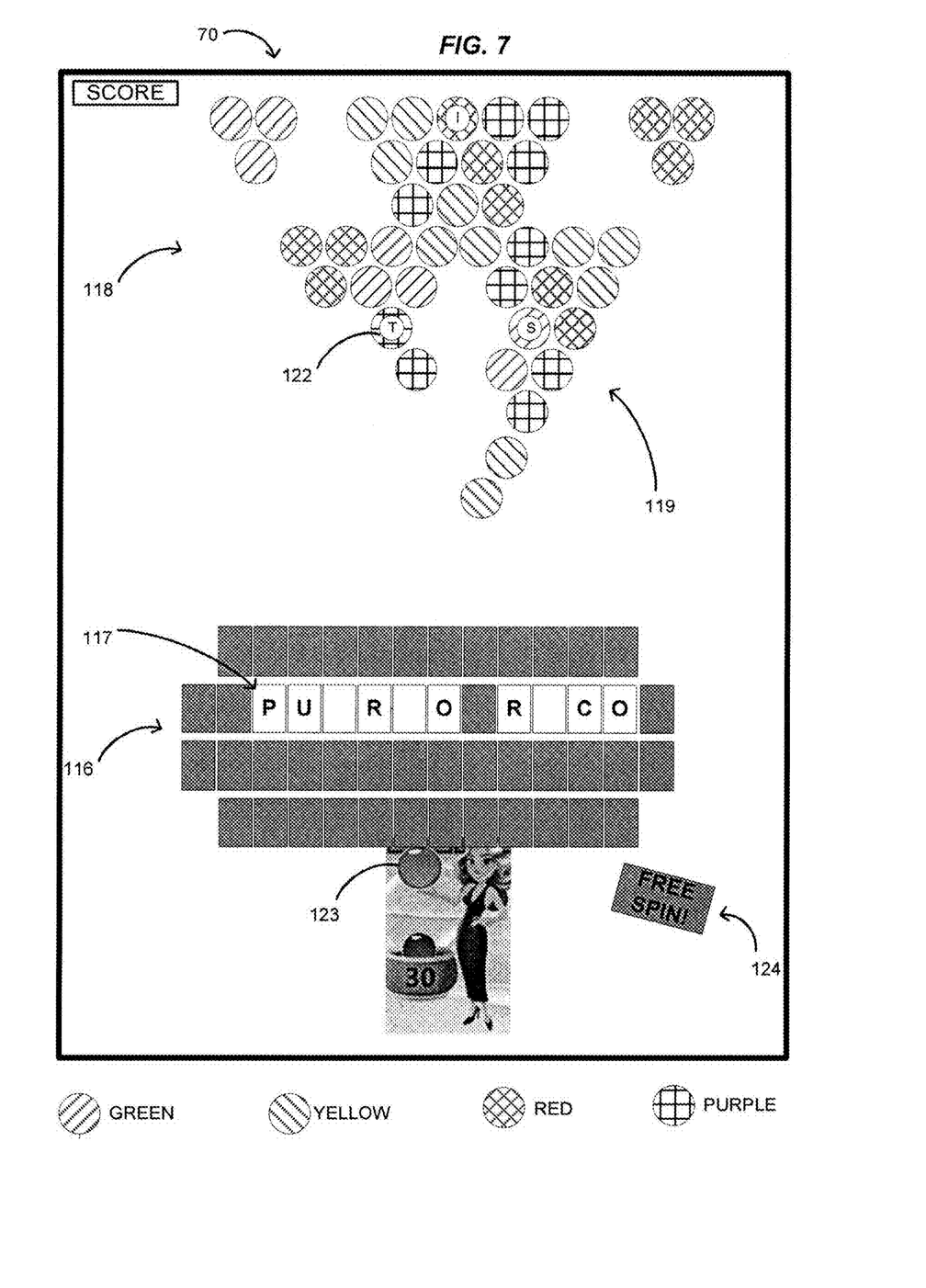
FIG. 7 is a user interface according to a particular implementation of present principles.

A particular implementation is now described with respect to FIG. 7, and in particular the same is shown as indicated by the user interface 70. A first portion of the user interface 116 shows a number of blocks, some of which constitute a data collection 117. In particular, a number of blocks are not used (dark coloring), but the blocks in light coloring constitute the data collection 117, and information about the data collection including the values of the key elements contained therein is stored in storage and or memory of a computing environment. The data collection 117 is shown as having two words that make up a phrase, the first word having six placeholder elements and the second word having four placeholder elements. In the first word, four values of key elements are non-obfuscated, i.e., unblinded. Two are shown as blinded. In the second word, four placeholder elements are shown, with three placeholder elements non-obfuscated or rather unblinded.

The user interface 70 further shows a plurality of target elements 119 on a second portion 118 of the user interface. Certain of these target elements, such as target element 122, include a value of a key element displayed thereon. The second portion of the user interface overlaps with the first portion 116 because an element 123 from the second portion is actually below the placeholder elements 117. In particular, user input in this implementation is by way of a object 123 which is caused to be moved towards the plurality of target elements by an action of the user on the user interface 70, e.g., a swiping action that provides a direction for the element 123. The object 123 is shown in red, and if the object 123 strikes any of the plurality of target elements that are not red, the object 123 may generally stick to the target element where the contact occurred. However, if the object 123 strikes an element that is red, i.e., shares a parameter in common with the object 123, then the object 123 and the target element or elements contacted may be caused to disappear, e.g., burst along with any other objects that share the parameter in common with the object, e.g., other red target elements. That is, other target elements may also be removed, if they share the common parameter and are in a contiguous line of target elements therefrom. For example, in FIG. 7, the plurality of target elements includes two sets of three red target elements where the three target elements form a triangle. If the object 123, also red, struck either of these sets of three target elements, the object 123 and the triangle of elements would be caused to disappear, e.g., with an appropriate audiovisual or visual effect, e.g., an explosion. However, as the red target element with the value of a key element "I" does not have a contiguous path with either of these triangular sets of target elements, the target element with the key value displayed of "I" would generally not be removed upon the contact of the object 123 with either of the triangular sets of elements.

Implementations and variations are now described.

In one implementation, a computer system executing a software application provides a word puzzle game where a player solves the puzzle (on the first portion of the user interface) by progressively unlocking letters until a puzzle word or phrase (e.g., "WHEEL OF FORTUNE") has been matched. In this implementation, the interactive user experience allows the user to solve a puzzle on a first portion of a user interface by unlocking elements of the puzzle, such as by unlocking letters of a word, on a second portion of the user interface. In the above framework, the key elements or letters would be unlocked when target elements or objects with the values of the key elements, i.e., the letters, are removed from the second portion of the user interface. In another variation, puzzle elements are unlocked using a matching mechanism or rules-based system to match a player-controlled element to a puzzle element, such as by matching circles with the same color. User options may be provided to change the matching mechanism, such as to directly unlock a puzzle element or to directly unlock multiple puzzle elements, e.g., with a "concentration" type game, where pairs of elements may be caused to be released upon a match being found.

In one implementation, the unlocking mechanism uses color matching. The computer presents a play area in the user interface of the computer system, the play area including three sections: a collection of puzzle boxes representing the letters of the puzzle phrase, a collection of target circles including letters to unlock, and a player circle used to unlock letters. Initially, at the beginning of a game, the puzzle phrase is hidden or blinded so all the puzzle boxes or placeholder elements are blank. Each target circle is shown having a parameter such as a color (multiple target circles may have the same color). Some of the target circles are also shown with a value of a key element, e.g., a letter, in the center of the target circle. The player circle, e.g., user input object, also has an associated parameter such as a color. To unlock a letter, the player guides the player circle to collide with a target circle that has the same color and that has a letter. When the player's circle collides with a target circle having the same color as the player's circle, the two circles disappear and if the target circle has a letter (see, e.g., key element 122 in FIG. 7), that letter is released or unlocked. (Alternatively, the target circle having the same color as the player circle and any other target circles of the same color adjacent to or connected to the first target circle also disappear, allowing chains and also possibly unlocking additional letters). When the player's circle collides with a target circle having a different color, the player's circle disappears (or alternatively remains in place, becoming a target element, e.g., target circle). When a letter is unlocked that matches or otherwise corresponds to a letter or letters in the puzzle phrase, the letter(s) in the puzzle phrase is unblinded or otherwise revealed by displaying the letter(s) on the corresponding puzzle box. If an unlocked letter does not match a letter in the puzzle phrase, the puzzle boxes do not change. After each collision (or based on another frequency), additional target circles are added to the play area, adding new letters to unlock. The player continues to guide player circles of varying colors toward the target circles until the puzzle phrase is completely revealed. In different examples and implementations, different unlocking mechanisms can be used, such as shape matching or rhythm matching.

A specific implementation of a word puzzle game using bubble objects is now described. In one implementation, players tap in a direction to shoot a colored ball toward bubbles at the top of the screen. Controlled shots can be done by dragging a finger across the screen to set an aim line and letting go. The ball being shot can burst bubbles of the same or a corresponding color if the ball being shot hits two or more connected bubbles (an exemplary minimum number of bubbles required for such a burst can vary). Players can aim around the wrong color or obstacles, e.g., relying on 'bank shots', in order to complete the goal in as few shots as possible and earn bonuses. A limited number of balls may be provided to complete the level goal, e.g., "complete the puzzle before you run out of balls/bubbles!", so as to increase the difficulty of the user interactive experience. By aiming so as to release or unlock desired letters, e.g., key element values displayed on target elements, players can solve the word puzzle in a desired fashion. In other words, knowing (or having a plan for) which letter to pop enables players to follow a desired path and complete the level without running out of balls—the fewer balls required to complete the puzzle and level, the more the bonus and high score. On the other hand, players can attempt to avoid popping letters that do not belong, as doing so will take away points.

Variations will be understood.

Different implementations can provide different types of interactive experiences, including puzzles to solve, unlocking mechanisms, and other variations that affect the system operation, network operation, and user experience.

For example, a purchase mechanism may be provided to allow users to access special tools or preferences, such as to access user options or to alter the appearance or operation of the presented interface, e.g., the user may make changes to the audio or video appearance.

In a related variation, elements of the presentation and operation can be changed by the user by selecting items to add to the user's game or profile. In one example, the user can use collected points to access background scenes displayed behind the play area (e.g., the default background is a green curtain and the user can use points to change the background to a beach scene or cloudy sunset scene). In another example, the user can use points to change or add visual or audio elements in the play area, such as changing music effects, or adding or changing clothing to a character presented in the play area (e.g., adding a hat to a child, changing a cat from black to white, or changing a human avatar into a robot with a wig). In one example, a user has a profile stored on the device that includes a code indicating the current selections for elements in the game and that code can be shared with another device to quickly replicate the experience of play on the other device. In another example, the user can spend real currency (e.g., US dollars) to purchase points or otherwise purchase such elements or modifications (e.g., buying skins).

Multiplayer features may be provided and supported to allow the sharing of games played and to share progress with other players on the same or different computer systems. Social features may also be provided to allow the sharing of information with other people using different computer systems, such as by sending game results to identified friends. In one example, a user can watch another user's game as a spectator. The playing user's device can stream data indicating the current gameplay to the spectator or send a complete data set (e.g., a recording) after the game is over.

In another variation, a player can solve the puzzle before unlocking all of the puzzle elements. In one example, the puzzle is a word puzzle where letters are revealed as the letters are unlocked. If the puzzle word is "SUPER" and the player has unlocked and revealed S, U, P, and E, the player may deduce that the puzzle word is SUPER without unlocking the final R. In this case, the user can activate an user interface element and in this way opt for an "early solve". The UI may then prompt the user for the user's solution for the puzzle, which may then be indicated as correct or incorrect. Different implementations could have different effects for successful and unsuccessful early solves, such as bonus points or penalties, point multipliers for continuing to unlock after an early solve, an option to end or continue the game, and so on.

In another implementation, unlocking a puzzle element has a point value that is variable. In one example, before attempting to unlock a puzzle element (e.g., before guiding a circle towards a target circle), the player randomly obtains a point value, such as by spinning a wheel (see element 124 on FIG. 7, which may cause such a wheel to appear). In another variation, the point value is randomly determined when a puzzle element is unlocked or during the unlocking process. In another example, the point value is adjusted based on time or difficulty of the unlock or based on the puzzle element being unlocked (e.g., in a word puzzle, based on letter frequency, unlocking a rare letter that matches a letter in the puzzle word is worth more points than unlocking a more common letter).

In another variation, the computer system creates a data structure corresponding to a "puzzle seed" at the beginning of a game that indicates the puzzle elements and how those puzzle elements will be made available for unlocking during play. Alternatively, the puzzle seed could be created after the game to indicate how the game occurred (e.g., including time stamps). For example, in a word puzzle, the puzzle seed indicates the letters of the puzzle phrase (e.g., a first plurality of key elements, including as an ordered combination) and when the puzzle letters will appear in the play area to be unlocked (e.g., by matching colored circles, constituting a $2^{nd}$ plurality of key elements, which may be determined by, e.g., random selection with or without reinsertion of the randomly selected key elements). In one such example, the other elements that are available for unlocking but not part of the puzzle solution are not included in the seed and could be generated as needed. In this case the seed would provide a similar experience but is not a complete recording of a game. The user could use the puzzle seed to play the game again with the same puzzle, such as to achieve a higher score (though this may not be very interesting depending on the type of puzzle). The user can also transmit a data structure corresponding to the puzzle seed to another user to share the experience or as a challenge (e.g., to solve the same puzzle with a better score). In one example, the receiving user can view game play recreated from the seed and attempt to solve the puzzle before the original player. In another example, the receiving player can play a new game using the puzzle seed, including unlocking elements. The game experience for the second user would be similar but not necessarily the same.

The puzzle seed allows a user to recreate a game experience but does not require the same data as a video recording or a complete mapping of all the game events, and thus provide significant benefits as to computing efficiency, storage required, battery life, and so on. The computer system can recreate a game using the game seed and add elements missing from the seed during play (e.g., circles without letters or letters that are not in the puzzle word). In another example, the puzzle seed could indicate that the first letter to present for unlocking is an "A", but not indicate where it is specifically, e.g., what color circle or where in the play area. This seed can provide a shared experience between players but as noted also allow for reduced data requirements (storage, processing, network traffic) compared to a complete data replication or recording of game play.

In another variation, the puzzle is based on elements and organization other than English letters and words. In one example, the puzzle elements are numbers and mathematical operators arranged to form a puzzle equation or formula. In one such example, multiple solutions may be available depending on the sequence of puzzle elements generated and presented for unlocking. In another example, the puzzle elements are shapes and the arrangement of the shapes together form a larger shape or picture. In another example, the puzzle elements are ingredients and the puzzle is to create food made from the unlocked ingredients. In another example, the puzzle elements can be combined more than once so that the puzzle has a multi-tiered solution, e.g., the puzzle is to create X from puzzle elements A, B, C and D, given that X is formed from Y and Z, and that Y is formed from A and B, and Z is formed from C and D. In another example, the puzzle elements are unlocked by timed operation of the user interface, such as by matching a musical rhythm with letters in motion.

In other variations, letters shown within the plurality of target elements need not necessarily be ones of the key elements in the data collection in the puzzle to be solved. Depending on the results in the main game, players can obtain free spins, e.g., if a letter is revealed, and can get boosters as a result, boosters that can be used in the main portion of the game, e.g., a projectile object that is more powerful and clears more of the plurality of target elements then regular user input objects. Players can move up levels after each (or a number of) puzzle is solved. Where the data collection is a word or phrase, a category of the word or phrase may be displayed as a hint.

In another variation, players may spin a virtual wheel upon the start of each level, which will reward them with a free power up to be used that level. Power-ups may include Supers (which create large blasts, improve aiming, or enable a ball to be any color) or Boosters (which adds more bubbles to shoot to complete the level). Players may also earn more spins during play by filling the spin meter with successful letter popping. Players can also buy more spins with in game currency as described below.

In another variation, in-game currency may be employed, and such are termed "coins". Coins may be purchased in packs via In-App Purchase. A limited number may be given out at the beginning of the game and earned as bonuses. Coins may be used to, e.g., buy vowels, like on the Wheel of Fortune TV show, so as to hasten solving the word puzzle and complete the level. The un-blinding of key elements may also be purchased with respect to non-vowel values. Players may also use coins to buy spins, or to buy more balls to shoot if the player runs out. Players may also use coins to purchase extra bubbles when losing a level.

In another variation, the game may have an animated rendition or avatar of a master of ceremonies, and a visual effect may be employed to have the avatar appear to throw the ball//other object and/or to offer encouragement to the player. The wardrobe or background may change to provide new environments or for seasonal or special events. For example, a "getaway" theme takes players to exotic, beautiful places like they might win on the show—Fiji Islands, Hawaii, the beaches of Mexico etc. A number of worlds may be provided, with multiple levels, and more of each may be provided in updates. A journey map tracking the player's progress—and their friends—may lend to the getaway theme. That is, levels may be presented in a World Map. Players may be able to see their progress on the World Map with a Player Icon. The path between worlds may be linear with level icons representing entry into each game level.

Returning to the provision of a game character representing the master of ceremonies, the same may be linked to an animation of the character becoming excited when the right letters are "popped", or upon the occurrence of a trigger event such as the wrong letters being popped, an animation may be displayed of the character becoming "sad". Other potential linkable animations that may be triggered on various events include: an animation for excited clapping for game start and correct letters; an animation for sad/upset when player loses; an animation for shrug when an incorrect letter is dropped; an animation to throw bubbles; and an animation for excited on game win.

In another variation, placeholder elements that are not used in a particular user interactive experience may be green, placeholder elements that represent blinded key value elements may be displayed in white until such time as the value is unblinded, spaces between words (where the data collection represents a phrase) may be displayed in blue, and placeholder elements with values of key elements displayed may be shown as a black letter with a white background.

In another variation, players may be enabled to interact in another visual or audiovisual experience as part of the initial visual or audiovisual experience. For example, players may be enabled to virtually spin the Wheel of Fortune at various times. Such times may include, e.g., at the start of a level, spending for "supers", and spending for extra bubbles. Wheel spins may have a weighted end result to help balance the game. When the Wheel is displayed, the player may swipe to "spin", and get awarded the "prize" it lands on.

Various examples of exemplary wheel spins are provided below. For example, at the start of a level, a wheel spin may be performed to determine a starting number of bubbles or other user input objects. In some cases, boosters may be provided, representing additional spins. Users may be enabled to spin for "supers", or may be enabled to select a super out of a list of supers.

Obstacles or other features may also be introduced on the wheel, e.g., every 10 levels, starting at a level 11, for a total of nine obstacles for the initial 100 levels. Exemplary obstacles or other features (hereinafter obstacles) may include "match bubble", which matches any ball thrown at it. A morph bubble may be provided that changes color each turn. A +Spin bubble may be provided which when hit instantly gives the player one or more extra spins, and may grant the player an extra "onboard super", e.g., which may "clear a row", provide a "bomb" that destroys additional target elements, or provides other features. Another obstacle may be a floating obstacle, that holds up all bubbles touching it. A further obstacle may be a rolling steel ball, that moves and covers a bubble each turn. Another obstacle may be ice, which starts off solid, but which breaks and becomes the color of any bubble or match made next to it. Another obstacle may be a spike bubble, that pops any bubble that it is thrown at. Another obstacle may be a letter swapper, which swaps between three preset letters, with some being correct (pertaining to the data collection) and others being incorrect. Another obstacle may be a smoke bubble, that alternates between covering bubbles around it in smoke.

Another feature provided may include boosters. Boosters may be randomized by using the +Spin iAP. Spins are generally used one at a time, and the same may grant the player their power directly after the player wins that booster.

As noted above, "supers" may also be employed. Supers may be powered up by collecting enough correct letters. The player may be given a super wheel to spin that will grant one of the supers at random. Exemplary supers include a radius bomb, that destroys target elements within a certain radius, e.g., two elements wide. Another super may include a row collapse, that destroys two rows and collapses the remaining rows together. Another super may be a dash bubble, that goes directly through bubbles, popping each that it passes. Some supers may multiply the power of a prior super or booster, e.g., ×3 of any booster.

In other variations, an aim line may be provided, to indicate to the user in what direction the user input object will traverse.

In noted above, in another variation, using an appropriate API to a social network, players can compare their progress to that of their friends, as well as compete for the highest score on each level. Players will have the opportunity to connect to Facebook and see their own Profile picture as well as other Facebook Friends on the Map. Players will also be able to see their Friend's score and rank on any level's leaderboard. Players may be enabled to connect to social networks to view a top 10 list of friends and their scores per level, to view a friend's progress on a world map, to share progress on their timeline of in game accomplishments, such as "New high score!", "Puzzle solved", and/or "I beat your score!". Sharing may also occur on a friend's timeline when they are passed on the leaderboard.

Various platforms may be supported, e.g., iOS, android, platforms pertaining to tablets and smart phones, computer operating systems, and so on.

Server Side Support may include parse support, including the ability to unlock content via a server, the ability to update level difficulty via server, and the ability to save data on the server via, e.g., social networks or Device_ID. Analytics may be provided, including any proprietary or required SDKs. AB testing may be supported, as well as push notifications and support for marketing and cross promotions.

One implementation includes one or more programmable processors and corresponding computer system components to store and execute computer instructions, such as to provide the presentation, operation, and user interface for a puzzle game using an unlocking mechanism.

In more detail, the system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that may be seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or wi-fi—connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where user interactive experiences are contemplated, the plural inputs may allow plural users to input relevant data at the same time.

While the invention herein disclosed is capable of obtaining the objects hereinbefore stated, it is to be understood that this disclosure is merely illustrative of the presently preferred embodiments of the invention and that no limitations are intended other than as described in the appended claims. For example, the invention can be used in a wide variety of settings, e.g., in the applications of education, nonlinear storytelling, gaming, gambling, and so on.

The invention claimed is:

1. A method of providing a plurality of video or audiovisual effects based on input by a user on a user interface of a computing environment, comprising:
    storing at least one key element in a memory of a computing environment;
    instantiating on a first portion of a user interface on the computing environment a data collection including the stored at least one key element, wherein the data collection including the at least one key element is in a blinded mode, such that the data collection shows a placeholder image in the location of, but not the value of, the at least one key element;
    instantiating on a second portion of the user interface on the computing environment a plurality of target elements, the instantiating on the second portion causing at least one of the plurality of target elements to additionally display on the target element the value of a key element from the stored at least one key element, wherein the target element with the key element value is at least partially surrounded by a plurality of adjacent target elements, the plurality sharing a parameter in common with the target element with the key element value;
    receiving user input on the user interface, the received user input indicating an act to be performed by an object on the second portion of the user interface;
    causing the object to perform the indicated act on the second portion of the user interface; and
    if the act matches a predetermined criterion, then unblinding a key element on the data collection, the unblinding displaying the value of the key element on the data collection, and further if the act matches the predetermined criterion, initiating a routine resulting in a first visual or audiovisual effect on the second portion of the user interface, the first visual or audiovisual effect including at least a removal of the target element with the key element from the second portion of the user interface, wherein the first visual or audiovisual effect includes instantiation of an animation indicating a removal of one or more of the target elements adjacent the target element with the key element value, wherein the target elements that are removed are those that share the parameter with the target element with the key element value, and such that the first visual or audiovisual effect causes a rearrangement of at least a portion of remaining ones of the plurality of target elements, the rearrangement being at least partially based on a calculation performed by a physics engine, and wherein the first visual or audiovisual effect causes a second visual or audiovisual effect, the second visual or audiovisual effect prompting the user to perform an action resulting in a selection of, or initiate a random selection of, an item affecting the step of receiving user input on the user interface.

2. The method of claim 1, wherein the parameter is a color, a symbol, or a design, or a combination of the above.

3. The method of claim 1, wherein the act is a tactical maneuver.

4. The method of claim 1, wherein the object is a projectile object.

5. The method of claim 4, wherein the projectile object performs the indicated act based at least partially on a calculation performed by a physics engine.

6. The method of claim 1, wherein upon the occurrence of a first rule, the object is transformed into a new target element among the plurality of target elements.

7. The method of claim 6, wherein the first rule is that if the object is moved toward the plurality of target elements based on the user input, and a first target element hit by the object is one that the object does not share a common parameter with, then the object is transformed into a new target element among the plurality of target elements.

8. The method of claim 1, wherein at least a plurality of blinded key elements are stored in the memory of the computing environment.

9. The method of claim 1, wherein the storing at least one blinded key element follows a step of receiving at least one blinded key element from a storage of the computing environment.

10. The method of claim 1, wherein the storing at least one blinded key element follows a step of receiving at least one blinded key element from a network environment to which the computing environment is in signal communication.

11. The method of claim 1, wherein the computing environment is a smart phone, tablet computer, laptop computer, desktop computer, smart television, smart watch, or gaming console.

12. The method of claim 1, wherein the first portion of the user interface and the second portion of the user interface partially overlap.

13. The method of claim 1, wherein the stored at least one key element represents a word or phrase or a shape.

14. A non-transitory computer-readable medium, comprising instructions for causing a computing environment to perform a method of providing a programmed visual or audiovisual effect based on input by a user on a user interface, comprising:
    receiving input from a user, the input received on a user interface, the input representing at least a direction for a projectile object to traverse across a generated geometric shape, the generated shape having located thereon a plurality of rendered objects;

simulating and animating movement of the projectile object according to the received input, the simulated and animated movement of the projectile object resulting in an intersection of a first collider component associated with the projectile object with a second collider component associated with one or more of the rendered objects, the method causing one of at least two programmed routines to run if the intersection occurs, a first programmed routine causing a first visual or audiovisual effect on the user interface of a removal of a rendered object if the projectile object and the intersected rendered object share a predetermined parameter, a second programmed routine causing a second visual or audiovisual effect on the user interface of an attachment of the projectile object to the one or more intersected rendered objects if the projectile object and the intersected rendered object do not share a predetermined parameter, and wherein the first visual or audiovisual effect further causes a third visual or audiovisual effect, the third visual or audiovisual effect prompting the user to perform an action resulting in a selection of, or initiate a random selection of, an item affecting the step of receiving user input on the user interface;

such that the first programmed routine also causes a visual or audiovisual effect of a removal of one or more adjoining rendered objects if the adjoining rendered objects share the predetermined parameter with the projectile object, and such that the first programmed routine causes a rearrangement of at least a portion of remaining ones of the rendered objects, the rearrangement being at least partially based on a calculation performed by a physics engine;

such that one or more of the plurality of rendered objects includes one or more key elements, a plurality of key elements constituting a data collection having a predetermined order, and such that if a rendered object having a key element is removed, the corresponding key element appears at a location in a representation of the plurality of key elements; and such that once all of the key elements appear at respective corresponding locations in the representation of the plurality of key elements, another visual or audiovisual effect is instantiated on the user interface.

15. The medium of claim 14, wherein the second programmed routine further comprises transforming the projectile object into one of the plurality of rendered objects.

16. The medium of claim 14, wherein the plurality of key elements constituting a data collection forms a word or phrase.

17. The medium of claim 14, wherein the plurality of key elements constituting a data collection forms a shape, and wherein the key elements are each subshapes of the shape.

18. A method of providing a programmed visual or audiovisual effect based on input by a user on a user interface, comprising:

instantiating a data collection associated with a plurality of key elements, the data collection visualized by instantiating and displaying in a first portion of a user interface one or more placeholder user interface elements, each placeholder user interface element representing one of the key elements, the placeholder user interface element initially displayed but not the value of the key element;

instantiating a user interaction zone in a second portion of the user interface, the user interaction zone including a plurality of target elements, a subset of target elements including and displaying a value of a key element associated with the data collection, wherein the target element with the key element value is at least partially surrounded by a plurality of adjacent target elements, the plurality sharing a parameter in common with the target element with the key element value;

receiving a user input and displaying a first effect of the received user input on the user interaction zone;

determining whether the user input is associated with a key element;

wherein if the user input is associated with a key element, the value of the key element is displayed within an associated placeholder user interface element, and wherein the first effect includes instantiation of an animation indicating a removal of one or more of the target elements adjacent the target element with the key element value, wherein the target elements that are removed are those that share the parameter with the target element with the key element value, and such that the first effect causes a rearrangement of at least a portion of remaining ones of the plurality of target elements, the rearrangement being at least partially based on a calculation performed by a physics engine, and further wherein the first visual or audiovisual effect causes a second visual or audiovisual effect, the second visual or audiovisual effect prompting the user to perform an action resulting in a selection of, or initiate a random selection of, an item affecting the step of receiving user input on the user interface and wherein if the user input is not associated with the key element, displaying a second effect of the received user input in the second portion of the user interface.

19. The method of claim 18, wherein the value of the key element represents a subshape, and wherein the data collection represents a word/phrase or a shape, respectively.

20. The method of claim 18, wherein the first effect of the received user input is to display an object moving toward the plurality of target elements, a direction of the object corresponding to the received user input.

21. The method of claim 20, wherein the determining whether the user input is associated with a key element includes determining if an object associated with the user input shares a parameter in common with a target element with which the object associated with the user input collides.

22. The method of claim 21, wherein the parameter is a color.

23. The method of claim 18, wherein the second effect of the received user input is to display an object moving toward and attaching to the plurality of target elements, a direction of the object corresponding to the received user input.

24. The method of claim 18, wherein if the user input is associated with a key element, further comprising displaying a removal of the target element including and displaying the value of the key element.

* * * * *